US009286530B2

(12) United States Patent
Moed et al.

(10) Patent No.: US 9,286,530 B2
(45) Date of Patent: Mar. 15, 2016

(54) HANDHELD APPARATUS FOR QUANTIFYING COMPONENT FEATURES

(75) Inventors: Michael C. Moed, Hopkinton, MA (US); Carl W. Gerst, III, Clifton Park, NY (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 13/550,658

(22) Filed: Jul. 17, 2012

(65) Prior Publication Data
US 2014/0021259 A1 Jan. 23, 2014

(51) Int. Cl.
G06K 7/10 (2006.01)
G06K 9/20 (2006.01)
G01B 11/25 (2006.01)
G06K 9/32 (2006.01)
G06T 7/60 (2006.01)
G06K 9/22 (2006.01)

(52) U.S. Cl.
CPC .............. G06K 9/2027 (2013.01); G01B 11/25 (2013.01); G06K 7/10544 (2013.01); G06K 9/3208 (2013.01); G06K 9/3216 (2013.01); G06T 7/602 (2013.01); G06K 9/22 (2013.01); G06T 2207/10016 (2013.01); G06T 2207/10152 (2013.01)

(58) Field of Classification Search
CPC .............. G06K 2207/1011; G06K 2207/1012; G06K 7/10801; G01B 11/25; G01B 11/2513; G01B 11/2518
USPC ............ 235/454, 454.01, 472, 462.21, 462.2, 235/439, 435; 356/603; 600/476; 702/173
See application file for complete search history.

(56) References Cited

U.S. PATENT DOCUMENTS

| 5,309,222 A * | 5/1994 | Kamei et al. .................. 356/613 |
| 5,870,191 A | 2/1999 | Shirley et al. |
| 6,078,251 A | 6/2000 | Landt et al. |
| 6,298,176 B2 | 10/2001 | Longacre, Jr. et al. |
| 6,336,587 B1 | 1/2002 | He et al. |
| 6,369,899 B1 | 4/2002 | Hamada |
| 6,824,058 B2 * | 11/2004 | Patel et al. ................. 235/462.2 |
| 7,256,899 B1 | 8/2007 | Faul et al. |
| 7,336,375 B1 * | 2/2008 | Faul et al. ..................... 356/604 |

(Continued)

FOREIGN PATENT DOCUMENTS

| CN | 101632030 A | 1/2010 |
| DE | 10321886 A1 | 12/2004 |

(Continued)

OTHER PUBLICATIONS

CN101632030 English Abstract.

*Primary Examiner* — Thien M Le
*Assistant Examiner* — Claude J Brown
(74) *Attorney, Agent, or Firm* — Quarles & Brady

(57) ABSTRACT

A handheld device and method using the device, the device comprising a sensor receiving light from within a field of view (FOV) to generate a plurality of consecutive images of the FOV, a structured light source that is controllable to generate a plurality of light patterns, the source arranged to project at least one light patterns into the FOV where at least a portion of a pattern reflects from an object and is captured by the sensor and a processor to receive images, the processor programmed to control the source to project a pattern into the FOV, locate the pattern in at least one of the generated images, locate discontinuities in the pattern and use the discontinuities to measure at least one dimension.

22 Claims, 15 Drawing Sheets

(56) References Cited

U.S. PATENT DOCUMENTS

| | | | |
|---|---|---|---|
| 7,514,702 B2 | 4/2009 | Barkan et al. | |
| 7,545,516 B2 | 6/2009 | Jia et al. | |
| 7,869,061 B2 * | 1/2011 | Sato et al. | 356/610 |
| 8,050,461 B2 | 11/2011 | Shpunt et al. | |
| 8,090,194 B2 | 1/2012 | Golrdon et al. | |
| 8,384,997 B2 | 2/2013 | Shpunt et al. | |
| 8,479,996 B2 | 7/2013 | Barkan et al. | |
| 8,492,696 B2 | 7/2013 | Akerman et al. | |
| 8,773,508 B2 | 7/2014 | Daniel et al. | |
| 2001/0028025 A1 | 10/2001 | Pease | |
| 2004/0008259 A1 | 1/2004 | Gokturk et al. | |
| 2010/0008588 A1 | 1/2010 | Feldkhun et al. | |
| 2010/0091104 A1 * | 4/2010 | Sprigle et al. | 348/136 |
| 2010/0141961 A1 * | 6/2010 | Knobel et al. | 356/612 |
| 2010/0222684 A1 * | 9/2010 | Hatzilias et al. | 600/476 |
| 2011/0025827 A1 | 2/2011 | Shpunt et al. | |
| 2011/0075156 A1 * | 3/2011 | Patel et al. | 356/603 |
| 2011/0229840 A1 * | 9/2011 | Liang et al. | 433/29 |
| 2011/0309149 A1 | 12/2011 | Testa | |
| 2012/0105868 A1 | 5/2012 | Nomura et al. | |
| 2012/0236288 A1 * | 9/2012 | Stanley | 356/4.01 |
| 2015/0309154 A1 | 10/2015 | Lohbihler | |

FOREIGN PATENT DOCUMENTS

| | | |
|---|---|---|
| WO | 2010147609 A1 | 12/2010 |
| WO | 2011011193 A1 | 1/2011 |

* cited by examiner

HANDHELD APPARATUS FOR QUANTIFYING COMPONENT FEATURES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to handheld devices that project light patterns onto an object in a sensor field of view (FOV) having object features to be quantified, that obtain two dimensional images of the FOV including the patterns reflected off the object and that use the patterns in the images to quantify the object features.

Handheld devices that project a light pattern onto an object in a sensor field of view (FOV) having a feature dimension to be measured, that obtain a two dimensional image of the FOV including the pattern reflected off the object and that use the pattern to identify the dimension to be measured are known. One problem with known devices of this type is that a device user is required to position the device such that the projected pattern is oriented in a specific fashion with respect to the feature to be dimensioned. For instance, where the thickness of an object is to be measured using a projected line pattern, the device has to be manipulated by the device user such that the line pattern is perpendicular to the thickness of the object being measured. If the device is not properly aligned, the thickness measurement will be inaccurate.

While aligning a light pattern with an object feature may seem to be a simple process, in at least some cases physical constraints of an environment in which a measurement is to be obtained may make it difficult to precisely align a handheld device with the feature. In addition, where several dimensions have to be measured, the additional time required for precise manual alignment of the device with the object to obtain each dimension can be burdensome.

BRIEF SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention includes a handheld device that is programmed to obtain a series of consecutive images of an object including at least one feature having at least one characteristic to be quantified where different light patterns are projected into a camera sensor's field of view during exposure to obtain the images and where at least a subset of the patterns projected are selected as a function of analysis of prior patterns in prior images and to result in relatively more accurate quantification of the characteristics to be quantified. For instance, where a feature dimension is to be obtained, the device may project an initial light pattern onto an object when a first image is obtained, calculate a value for the dimension to be measured from the projected pattern in the first image, project a second pattern of light while a second image is obtained, calculate the dimension from the projected pattern in the second image and then select subsequent light patterns to be projected when subsequent images are obtained where the subsequent light patterns are selected as a function of the dimensions calculated using the first and second light patterns and so that a dimension calculation resulting from the subsequent patterns is relatively more accurate than the previous dimensions. Other object features may be quantified in a similar fashion by iteratively selecting different light patterns to project into the sensor FOV while images are obtained in an intelligent fashion.

Consistent with the above comments at least some embodiments include a handheld device for determining at least one dimension of an object, the device comprising a hand held device housing structure, a sensor mounted within the housing structure, the sensor receiving light from within a sensor field of view (FOV) to generate a plurality of consecutive images of the sensor FOV, a structured light source that is controllable to generate a plurality of light patterns, the structured light source mounted to the housing for movement along with the sensor and arranged to project at least one of the plurality of light patterns into the sensor FOV where at least a portion of a projected light pattern reflects from an object located within the sensor FOV and is captured by the sensor and a processor linked to the sensor to receive images of the sensor FOV generated by the sensor, the processor programmed to control the structured light source to project a light pattern into the sensor FOV, locate the projected light pattern in at least one of the generated images, locate discontinuities in the projected light pattern and use the discontinuities to measure the at least one dimension of the object in the sensor FOV.

In some embodiments the processor is programmed to identify different projected light patterns in at least a first and a second of the consecutive images and identifies discontinuities in each of the first and second images. In some cases the processor is programmed to identify the at least one dimension of the object using the discontinuities in each of the first and second light patterns and to select one of the identified dimensions as the at least one dimension. In some embodiments the processor is programmed to select at least one of the light patterns that the light source projects into the FOV as a function of the identified at least one dimension associated with at least a subset of the prior image.

In some embodiments the processor is programmed to identify a first projected light pattern in a first of the consecutive images, identify discontinuities in the first identified light pattern and use the discontinuities in the first light pattern to identify a first instance of the at least one dimension of the object, identify a second projected light pattern in a second of the consecutive images, identify discontinuities in the second identified light pattern and use the discontinuities in the second light pattern to identify a second instance of the at least one dimension of the object, compare the first and second instances of the at least one dimension of the object and select a third light pattern to project into the FOV when the sensor obtains light to generate a third image by comparing the first and second instances of the at least one dimension. In some cases the processor is further programmed to identify the third projected light pattern in the third image, identify discontinuities in the third identified light pattern and use the discontinuities in the third light pattern to identify a third instance of the at least one dimension of the object, and select a fourth light pattern to project into the FOV when the sensor obtains light to generate a fourth image by comparing the third instance of the at least one dimension to at least one of the first and second instances of the at least one dimension.

In some embodiments the processor is further programmed to identify projected light patterns in at least a subset of the plurality of generated images, identify discontinuities each of the identified projected light patterns and use the discontinuities to identify a separate instance of the at least one dimension of the object for each of the subset of the plurality of generated images. In some embodiments the processor selects the shortest of the separate instances of the at least one dimension as the at least one dimension. In some cases the processor is programmed to continually obtain consecutive images using different light patterns until the processor identifies the at least one dimension of the object.

In some embodiments the processor is further programmed to compare the light patterns projected to the light patterns in the obtained images to identify a distance between the sensor and the surface of the object from which the light reflects and to use the identified distance as part of a calculation to identify the at least one dimension. In some embodiments at least one of the projected light patterns is selected to generate a rough estimate of the distance between the sensor and the surface of the object from which light reflects and a subsequent one of the projected light patterns is selected to generate a more precise measurement of the distance between the sensor and the surface of the object from which the light reflects.

In some cases the processor is further programmed to identify machine readable code candidates in the obtained image and to attempt to decode identified code candidates. In some cases the device further includes a user selectable activator linked to the processor for triggering the light source, sensor and processor to project light patterns, obtain images of the FOV and process the obtained images. In some embodiments the structured light source includes a digital light processing (DLP) projector.

In some cases the processor uses a DLP metrology process to identify the at least one dimensional feature. In some embodiments the processor is further programmed to identify machine readable code candidates in the obtained image and attempt to decode the code candidates and wherein the structured light source includes a digital light processing (DLP) projector, the DLP projector controlled by the processor to generate the light patterns in the images and to also generate light to illuminate code candidates within the FOV.

Other embodiments include a handheld device for determining at least one dimension of an object, the device comprising a hand held device housing structure, a sensor mounted within the housing structure, the sensor receiving light from within a sensor field of view (FOV) to generate images of the sensor FOV, an illuminator mounted to the housing for movement along with the sensor and arranged to project a plurality of different light patterns into the sensor FOV where at least a portion of the projected light pattern reflects from an object located within the sensor FOV and is captured by the sensor and a processor linked to the sensor to receive images of the sensor FOV and linked to the illuminator for controlling selection of a first projected light pattern, the processor programmed to locate the first projected light pattern in a first obtained image, examine the first projected light pattern to identify a second light pattern that may be better suited to locate discontinuities useful in identifying the at least one dimension of the object in the sensor FOV, control the illuminator to project the second light pattern into the sensor FOV while a second image is obtained, locate the second pattern in the second image, locate discontinuities in the second pattern and use the discontinuities in the second light pattern to measure the at least one dimension of the object in the sensor FOV.

In some cases the illuminator is a digital light processing (DLP) projector. In some cases the projector projects patterns into the FOV and the processor identifies discontinuities by comparing the projected patterns to the patterns identified in the obtained images.

Still other embodiments include a method for use with a handheld device for determining at least one dimension of an object, the handheld device including an image sensor having a field of view (FOV) and an illuminator mounted to a handheld housing so that the sensor and illuminator are manipulated as a single unit, the method comprising the steps of using a processor in the handheld device to perform the steps of projecting a first light pattern into the sensor FOV while an object is located within the sensor FOV, obtaining an image of the sensor FOV, locating the first projected light pattern in a first obtained image, examining the first projected light pattern to identify a second light pattern that may be better suited to locate discontinuities useful in identifying at least one dimension of an object in the sensor FOV, controlling the illuminator to project the second light pattern into the sensor FOV while a second image is obtained, locating the second light pattern in the second image, locating discontinuities in the identified second light pattern and using the discontinuities in the identified second light pattern to measure the at least one dimension of the object in the sensor FOV.

The following description and annexed drawings set forth in detail certain illustrative aspects of the present invention. These aspects are indicative, however, of but a few of the various ways in which the principles of the invention may be employed and the present invention is intended to include all such aspects and their equivalents. Other advantages and novel features of the present invention will become apparent from the following detailed description of the invention when considered in conjunction with the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
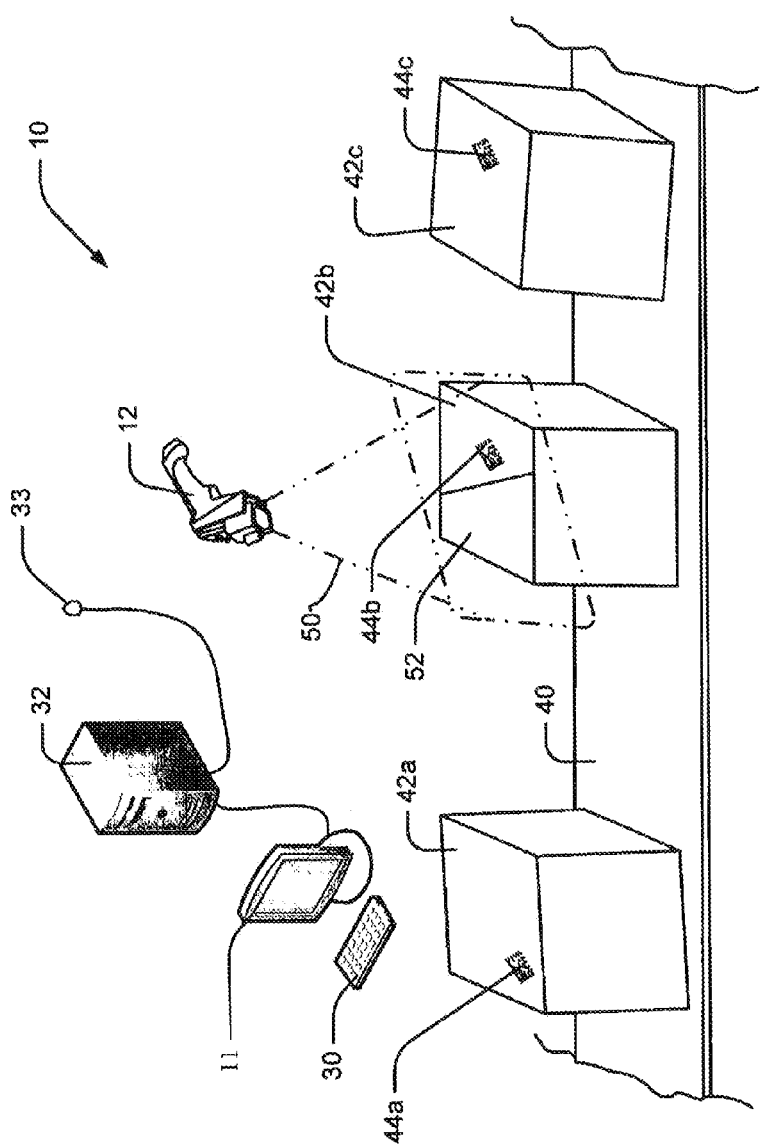
FIG. 1 is a schematic diagram illustrating a parts handling system in which a hand-held device that performs various methods consistent with at least some aspects of the present invention is illustrated.

Referring now to the drawings wherein like reference numerals corresponding to similar elements throughout the several views and, more specifically referring to FIG. 1, the present invention will be described in the context of an exemplary materials handling assembly 10 that includes a transfer line 40 for moving cubic objects such as boxes or the like 42a, 42b, and 42c through a work station. Each of the objects is marked with a machine readable code (e.g., a bar code, a two-dimensional matrix code, etc.) where the codes are identified in FIG. 1 by numerals 44a, 44b and 44c that are applied to at least one of the surfaces of the object. In FIG. 1, code 44b is applied to exemplary surface 52 of object 42b. As objects 42a, 42b, 42c, etc., are moved to the station, equipment at the station is used to read the codes on the objects to identify the objects. In addition, station equipment is used to image objects and determine object dimensions. Where the objects needs to be loaded onto trucks for deliver, software may use the object dimensions to plan an efficient loading sequence and arrangement.

System 10 includes a computer 32 linked to a human/machine interface including a flat panel display screen 11 and an input device 30 including a keyboard. Other input devices and interface devices are contemplated. Computer 32 is also linked to a wireless access point 33. Although not illustrated, system 10 may also include one or more object position sensors linked to computer 32 to identify specific locations of the objects 42a, 42b and 42c as they pass through the station illustrated so that object characteristics sensed at the station can be correlate with specific objects and object locations.

Figure 2:
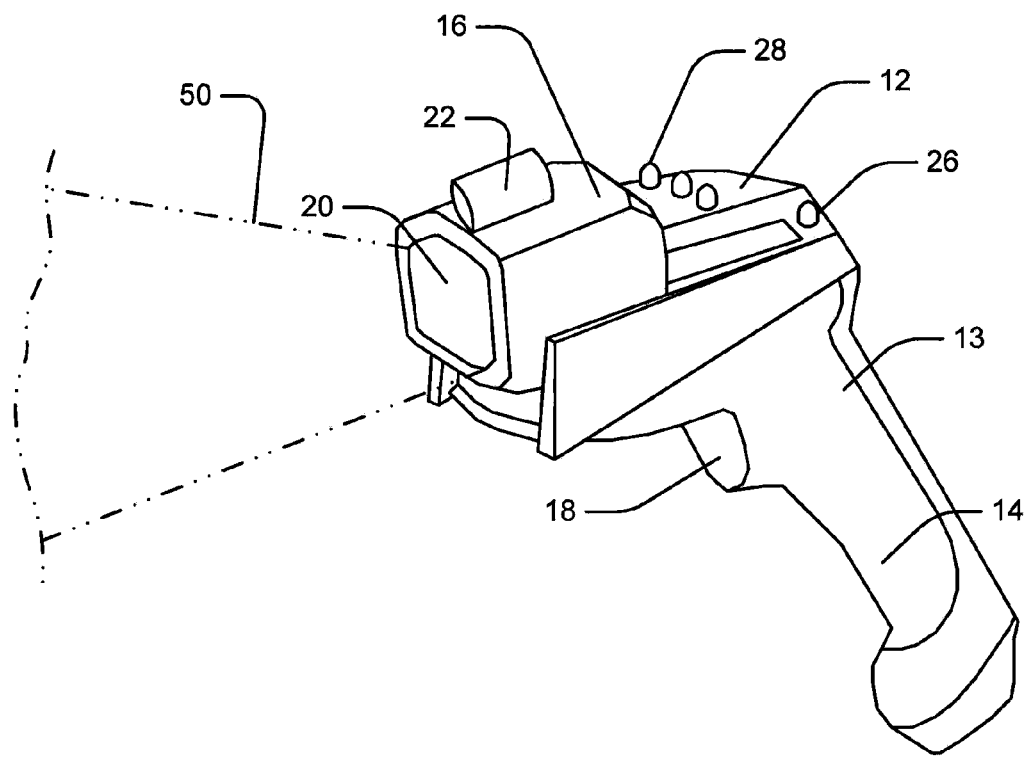
FIG. 2 is an enlarged perspective view of the hand-held device shown in FIG. 1.
Figure 3:
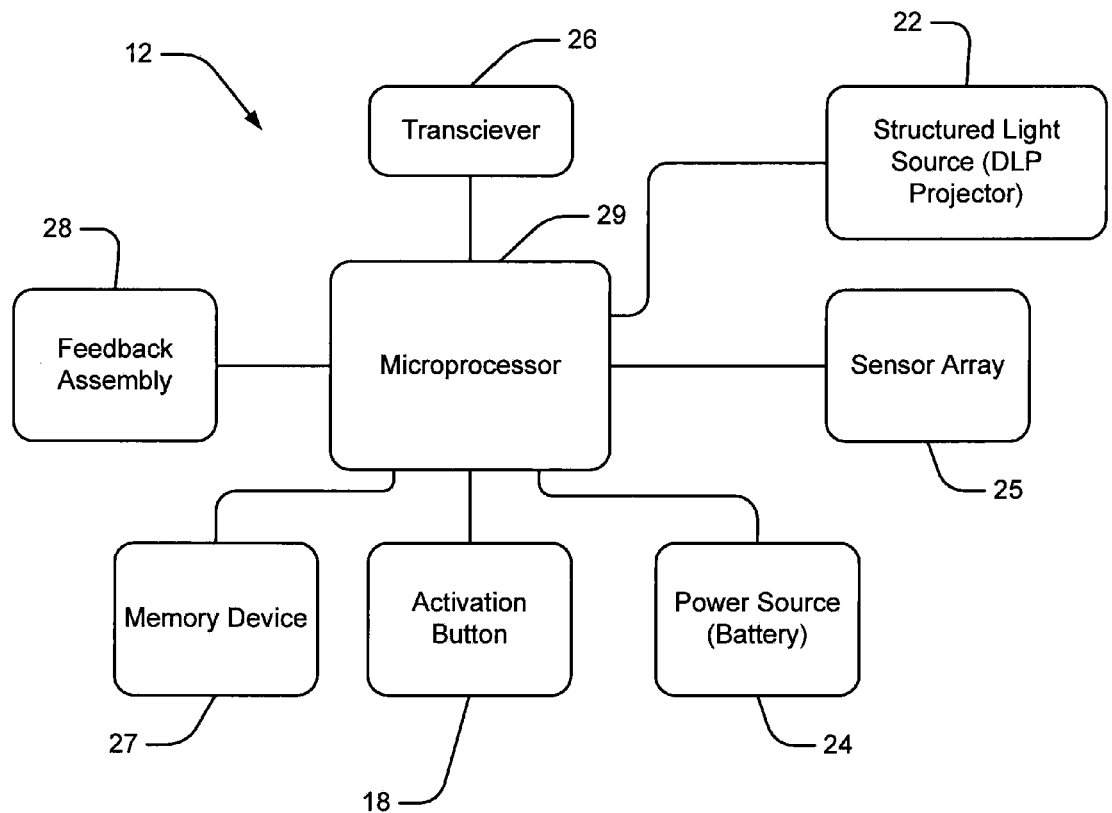
FIG. 3 is a schematic diagram illustrating various components of the hand-held device shown in FIG. 2.

Referring still to FIG. 1, system 10 includes an exemplary hand-held electronic device 12 that may be used to perform various methods that are consistent with at least some aspects of the present invention. Referring also to FIGS. 2 and 3, exemplary hand-held device 12 includes a device housing structure 13 that is typically formed of an impact resistant material such as plastic, fiberglass, etc. Structure 13 forms an ergonomic handle portion 14 and a barrel portion 16 that extends from a top end of handle portion 14 like the barrel of a gun extends from the handle of a gun. Hand-held device 12 also includes an activation button 18, a lens sub-assembly 20, a structured light source 22, a power source 24, a sensor array 25, a transceiver 26, a memory device 27, a feedback assembly 28 and a microprocessor 29, each of which is either supported by or supported within the device housing structure 13.

Microprocessor 29 is linked to each of the activation button 18, light source 22, power source 24, sensor array 25, transceiver 26, memory device 27 and feedback assembly 28 to control each of those devices to facilitate the processes described hereafter. To this end, microprocessor 29 is linked to memory device 27 which stores software programs run by processor 29 to perform various processes. In addition, memory device 27 may be used to at least temporarily store images generated by sensor array 25 as well as to store the results of various calculations that occur during image processing. Activation button 18 is linked to processor 29 to enable a device user to control operation of the device 12 by pressing button 18. Power source 24 is linked to microprocessor 29 to provide power thereto. In at least some embodiments, power source 24 may include a battery. In other embodiments, the power source 24 may include components that enable microprocessor 29 to be linked via a cable to an external power source.

Referring still to FIGS. 2 and 3, feedback assembly 28 may take any of several different forms and, in general, provides feedback to a device user. For example, as shown in FIG. 2, feedback assembly 28 may include one or more LEDs mounted to a top or side wall of barrel portion 16, generally within the direct line of sight of a person using device 12. In at least some embodiments, the LEDs 28 may be different colors to indicate different statuses of the processes performed by microprocessor 29. For instance, a yellow LED may indicate activation of device 12 to obtain images of an object and that a process to be performed has not been completed while a green LED indicates a completed process. A red LED may indicate that a process has timed out without being successfully completed. For instance, if the process to be performed includes measuring an object dimension and device 12 is not positioned properly to image the object so that processor 29 fails to generate a reliable dimension within a time out period, an illuminated red LED may indicate to a user that device 12 should be repositioned. An illuminated greed LED may indicate that a dimension has been calculated.

Although not shown, in other embodiments, feedback assembly 28 may include a small display screen mounted to barrel portion 16 to provide process feedback to a user. In addition, assembly 28 may include a audible device such as, for instance, a beeper, a speaker, etc., for providing process feedback. In still other embodiments the functions performed by feedback assembly 28 may include, be supplemented by, or be replaced by functions performed by processor 29. For instance, where display 11 is positioned at the illustrated transfer line in FIG. 1 within direct sight of a device user, processor 29 may transmit feedback information or information (e.g., a successfully measured dimension) from which feedback information can be derived to computer 32 via transceiver 26 and access point 33 and computer 32 may be programmed to present feedback to the user via display 11. As another instance, processor 29 may be programmed to drive light source 22 to provide feedback via the surface of an object being imaged by projecting different light colors to indicate process status, projecting words such as "measurement complete" or "reposition device" etc. Moreover, after one or more dimension have been calculated, processor 29 may control light source 22 to project and show the dimension on the actual object being images (e.g., a two headed arrow with the dimension measurement spatially associated therewith maybe projected on an object).

Referring still to FIGS. 2 and 3, sensor array 25, in at least some embodiments, will include a two-dimensional imaging array such as a CCD or a CMOS imaging array as well known in the code reading art. Array 25 may be mounted within barrel portion 16 with lens subassembly 20 optically aligned therewith to focus light from within a field of view 50 of the lens subassembly 20 onto the sensor array 25. Array 25 collects the light that subtends the array and generates images of objects located within field of view 50.

Referring to FIGS. 1, 2 and 3, in general, when activation button 18 is pressed, processor 29 causes array 25 to collect light and generate a plurality or consecutive images thereby forming a series of images that are examined by processor 29 to perform various functions.

Referring yet again to FIGS. 2 and 3, structured light source 22 is light source that can be controlled to project any of a plurality of light patterns within the sensor's field of view 50. In at least some embodiments, light source 22 will include a digital light processing (DLP) projector which can be controlled to generate essentially any desired light pattern within FOV 50. For instance, one pattern that may be generated by light source 22 may include a single straight line that divides the field of view 50 into upper and lower halves. Other instances of projected patterns may include other single lines that divide the field of view 50 differently such as horizontal lines that are higher or lower than a central line within the field of view 50, vertical lines that divide the field of view 50 either evenly or unevenly, or angled lines that divide the field of view 50. More complex instances of projected patterns may include a plurality of lines that form a burst pattern, a matrix of dots, or uniform patterns of other geometric shapes such as squares, rectangles, ovals, etc. Still other light patterns may include a circular bulls-eye type pattern, a rectangular or square bulls-eye type pattern, triangular patterns, etc.

The light pattern projected by source 22 has a wavelength that can be sensed and distinguished by sensor array 25. Thus, when array 25 obtains light from field of view 50 while source 22 generates a structured light pattern, the pattern or at least portions of the pattern show up in the image generated by sensor array 25 Although not shown, in at least some embodiments it is contemplated that the light source may generate light patterns having a specific wavelength or wavelengths within a known range and a filter may be used to separate the pattern light from other light in the field of view of the sensor so that the processor can distinguish the pattern from other light.

Figure 4:
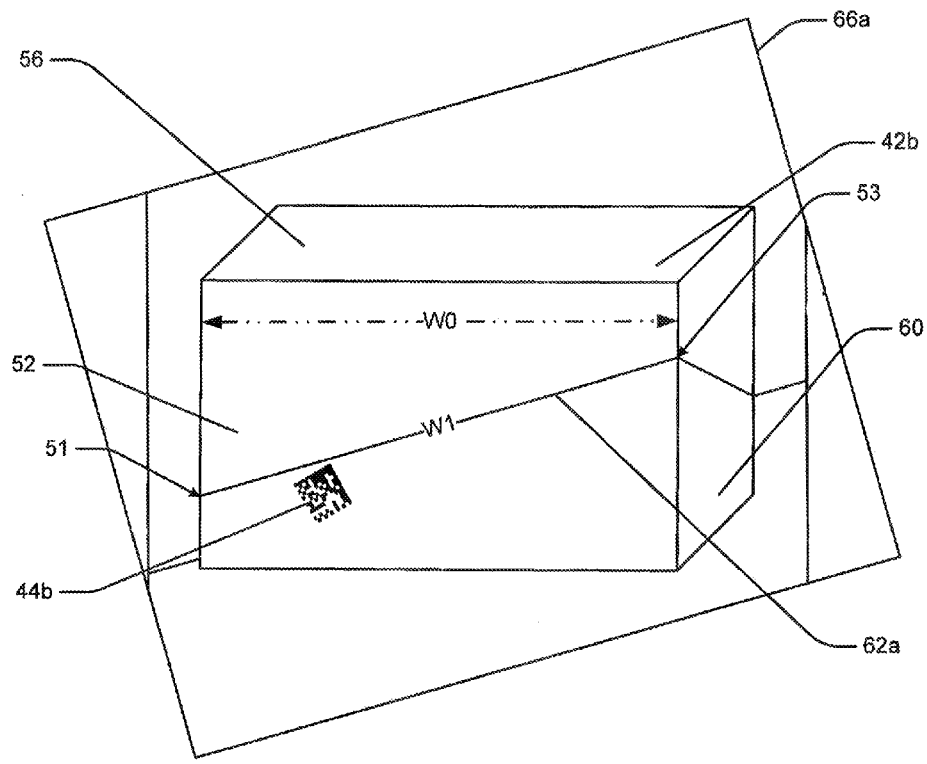
FIG. 4 is a schematic showing an exemplary image of a cubic object including a first line light pattern on the object that may be generated by the sensor array shown in FIG. 3.

The characteristics of the pattern in an obtained image are affected by the geometry of the object or objects within the sensor field of view 50 relative to the sensor array. Thus, for instance, referring also to FIG. 4, when light source 22 projects a line pattern of light 62a onto the surface 52 of an object 42b where the line extends past edges 51, 53 of the object, discontinuities in the line will occur at the edges of the object (see that the pattern 62a in FIG. 4 breaks off at edge discontinuities 51 and 53). For this reason, edges of an object within an image can be identified by examining a projected light pattern within the image and identifying pattern discontinuities. In the case of a cubic object like a box, where two edges of the object can be identified, microprocessor 29 can use the locations of the edges within an obtained image to calculate a dimension between the two edges and hence, to calculate a length, a width or a height of the object. In FIG. 4, the dimension W1 between discontinuities 51 and 53 can be calculated.

It has been recognized that when a simple light pattern is projected onto an object using a hand-held device like the device 12 illustrated in FIG. 2, in many cases a device user will not properly align device 12 with the object to be dimensioned such that a dimension calculated using the projected pattern in the obtained image will yield an inaccurate dimension value. In this regard, see again FIG. 4 where exemplary cubic box 42b is shown in an image 66a generated by sensor array 25 where box 42b includes a top surface 52 as well as front and side surfaced 56 and 60, respectively. In this simple example it will be assumed that device 12 is to be used to measure a width dimension W0 across the width of top surface 52 (see FIG. 4). In order to accurately measure the width of any cubic object, the shortest dimension between the edges that define the width should be measured. In FIG. 4, clearly pattern 62a is not aligned so that the portion of the pattern subtending surface 52 is parallel to width dimension W0 and therefore, if the dimension W1 between discontinuities 51 and 53 is measured, the resulting value W1 will not be an accurate representation of dimension W0.

Projected light pattern 62a includes a single line pattern that divides the field of view 50 (see again FIG. 2) and hence the image 66a into upper and lower halves. As shown, box 42b includes a top surface 52 as well as side surfaces 56 and 60. Pattern 62a appears at least in part across top surface 52 and down side surface 60. Discontinuities 51 and 53 occur within pattern 62a at opposite edges of top surface 52.

Recognizing the high probabilities of errors like the one described above with respect to FIG. 4, device 12 has been developed wherein processor 29 controls the light source or projector 22 to project different light patterns during a series of consecutive imaging procedures in rapid succession where the light patterns are selected so that at least one of the light patterns will result in an image where the pattern can be used to relatively accurately determine a dimension of a cubic object regardless of the orientation of device 12 with respect to the surface of the object being imaged.

Figure 6:
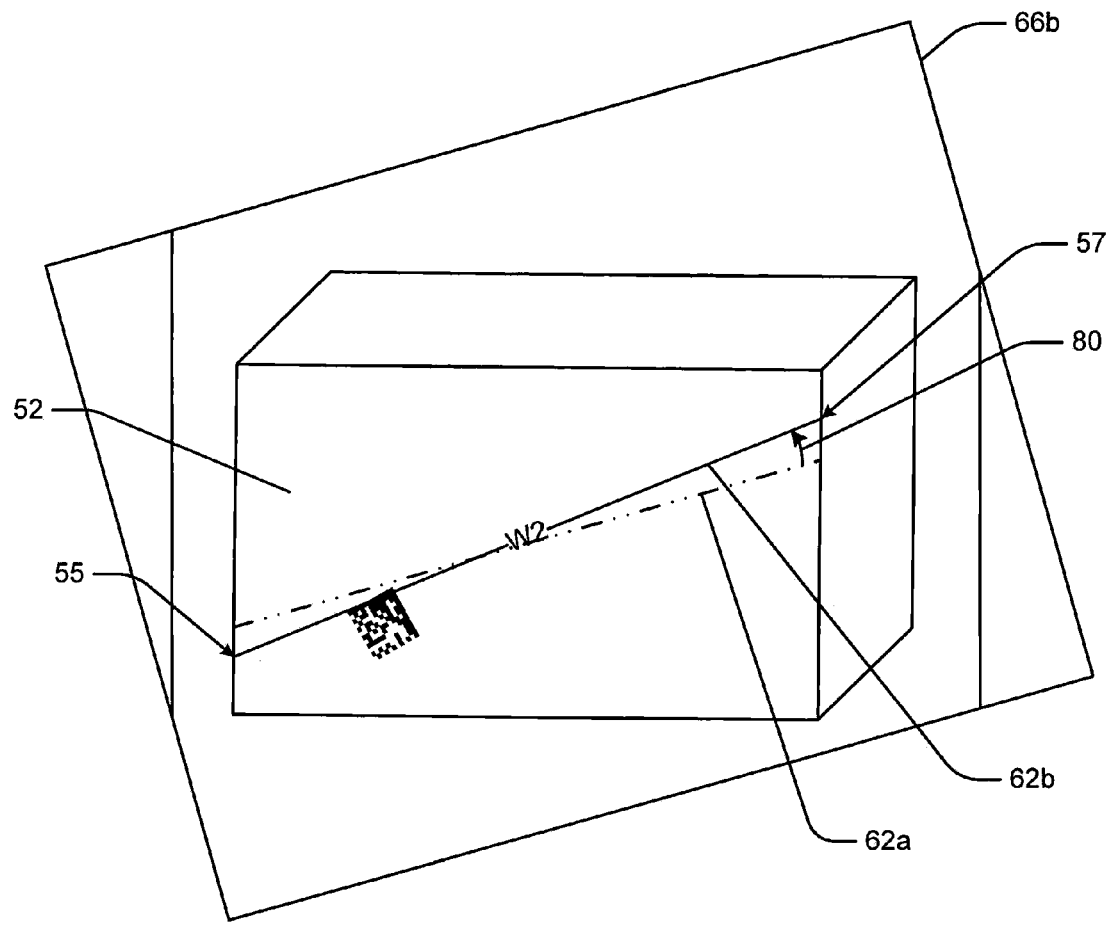
FIG. 6 is similar to FIG. 4, albeit showing a second light pattern on the cubic object within an image.

In at least some embodiments processor 29 is programmed to use the results of dimension measurements from a first subset of images including a first subset of projected light patterns to select subsequent projected light patterns that are relatively more likely to yield accurate dimension measurements. For instance, referring again to FIG. 4, to measure width dimension W0, ideally the shortest dimension between opposite edges of surface 52 is measured. Referring also to FIG. 6, if two separate line patterns 62a and 62b are used to generate dimension measurements and pattern 62a yields a shorter dimension than pattern 62b, clearly pattern 62a is a more accurate representation of dimension W0 and that information can be used to select a next projected light pattern. Processor 29, therefore, is programmed to intelligently select different light patterns to hunt for the shortest width dimension measurement.

Importantly, while a series of images are consecutively obtained, because sensor and processor speeds have increased recently and will continue to increase moving forward, an entire dimensioning process should only take a fraction of a second assuming at least some reasonable degree of alignment of device 12 with an object surface (e.g., surface 52 in FIG. 4) to be dimensioned. In addition, because the process will be completed extremely quickly, any inadvertent movement of device 12 that could hamper the dimension calculation process should be irrelevant. Moreover, in at least some embodiments the light pattern will include multiple simultaneous lines so that information such as perceived distances between the known pattern of lines and the angles between lines referenced to a norm will enable the processor to generate accurate measurement information.

In many applications there will likely be a threshold accuracy level that needs to be achieved where that threshold level is less than absolute accuracy. For instance, once changes in consecutive width dimension measurements are less than one centimeter, an acceptable accuracy may be achieved in some applications. After acceptable accuracy is achieved, processor 29 may stop the imaging process, transmit the dimension result to computer 32 via transceiver 26 and access point 33, and indicate successful measurement via the feedback device 28 or in any other supported fashion.

In the exemplary process described next, it will be assumed that processor 29 is programmed to perform a process to determine width W0 of surface 52 of object 42b shown in FIG. 4 when activation button 18 (see again FIG. 2) is pressed. It will also be assumed that the threshold level or value indicating required accuracy is one centimeter meaning that once width accuracy is within one centimeter of the actual width W0, the process should cease.

Figure 5:
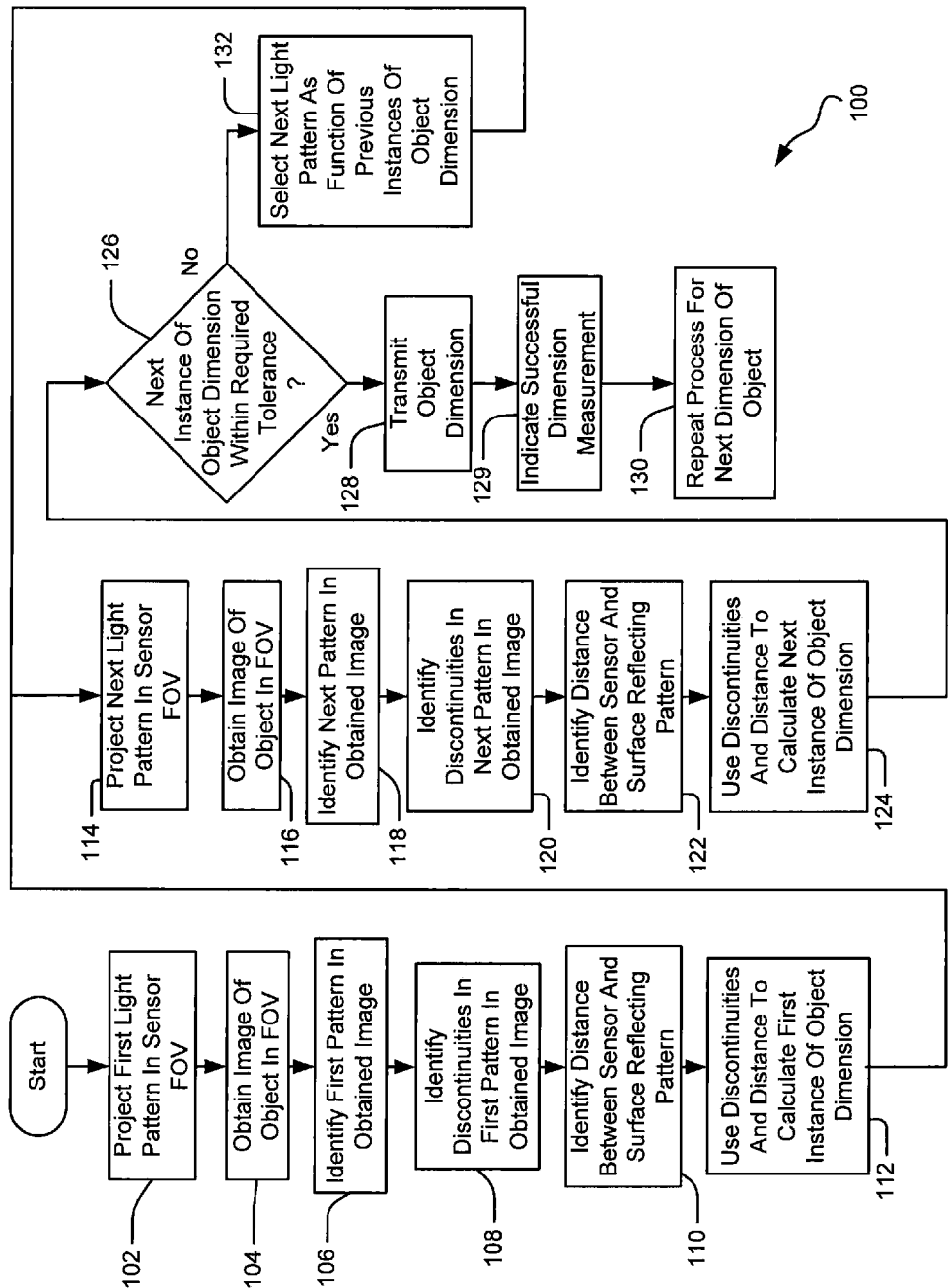
FIG. 5 is a flow chart illustrating a process that may be performed by the components shown in FIG. 3 to determine a dimension of a cubic object by examining projected light patterns in a series of images.

Referring now to FIG. 5, a process 100 that may be performed by microprocessor 29 and the other components described above with respect to FIG. 3 for measuring dimension W0 is illustrated. Where height and length dimensions of object 52b are to be measured, process 100 would be repeated for each of these dimensions. Referring also to FIGS. 1-4, at block 102, processor 29 controls light source 22 to generate a first aiming pattern which is projected into sensor field of view 50. At block 104, processor 29 obtains an image of an object 42b (see FIG. 1) located within the sensor's field of view 50. As shown in FIG. 4, exemplary first image 66a includes object 42b and projected pattern 62a appears in the image.

Referring still to FIGS. 1-5, at block 106, processor 29 identifies the first pattern 62a in the obtained image. At block 108, processor 29 identifies discontinuities in the first pattern in the obtained image 66a. In FIG. 4, the discontinuities are indicated by numerals 51 and 53 and occur at opposite edges of surface 52. At block 110, processor 29 identifies distances between the sensor array 25 and the surface 52 of object 42a that is reflecting the light pattern 62a at the dimensions 51 and 53.

Determining the sensor to surface distances can be accomplished by examining characteristics of pattern 62a adjacent discontinuities 51 and 53 on surface 52. In this regard, it is known that even in the case of a structured light pattern, the pattern changes as the distance along which the pattern of light travels increases and as a function of the angle of a hand held unit to the surface on which the pattern is projected. For instance, a line pattern becomes thicker as the sensor to surface distance increases. As another instance, the angle between two projected lines changes as the angle between a hand held device and the surface projected onto changes. Thus, by comparing the thickness of the portion of the pattern on surface 52 to the thickness of the projected pattern and comparing the projected angle between two lines and the perceived pattern, a sensor to surface distance and a device to surface angle can be determined. As another instance, the dimensions between parallel lines in a pattern, all other things being unchanged, will change as a function of distance and therefore a sensor to surface distance can be determined by measuring a dimension between lines and comparing to a table the correlates dimensions and distances. As still one other instance, a line or line pattern may be projected within a sensor FOV at an angle and the location of the line in a resulting image may be used to measure sensor to surface distance as the location of an angled line pattern in an obtained image will be a function of distance. Other ways of determining sensor to surface distance and device to surface angle that are known in the art including various triangulation processes are contemplated and may be employed in at least some embodiments of the present invention.

In some cases, it is contemplated that device 12 may be skewed with respect to a reflecting surface such that one end of the portion of the projected pattern on a surface may be closer to the sensor than the other end of the portion of the projected pattern on the surface. In this case, determining the sensor to surface distance may require determining two or more distances, such as, for instance the sensor to surface distances at the opposite ends of the portion of a projected pattern on surface 52. Here, two separate processes for identifying sensor to surface distance would be performed by processor 29, one process adjacent each of the discontinuities 51 and 53.

At block 112, processor 29 uses the discontinuities and the sensor to surface distance value(s) to calculate a first instance of the object dimension identified as W1 in FIG. 4. Here, the first instance W1 of object dimension, while similar to actual width dimension W0, is different because of the misalignment of pattern 62a with respect to the surface 52.

Referring still to FIGS. 1-5, at block 114, processor 29 causes light source 22 to generate a next light pattern in the senor FOV 50. Referring also to FIG. 6, a next image 66b is illustrated that shows the first light pattern 62b in phantom and the next light pattern 62b where it can be seen that the next light pattern 62b is rotated counter-clockwise from first pattern 62a as indicated by arrow 80. While initial counter-clockwise rotation is shown, the initial direction of rotation is simply a matter of designer choice. In other embodiments initial rotation may be clockwise. The degree of initial rotation 80 is also a matter of designer choice but should be large enough to likely result in a disparity between dimensions W1 and W2 (see again FIGS. 4 and 6). In the present example, it should be assumed that the device user will at least somewhat position device 12 so that the projected pattern is aligned with the dimension being measured so that the initial rotation 80 should not be too large. At block 116, processor 29 obtains the second image 66b shown in FIG. 6. At block 118, processor 29 identifies the next pattern 62b in the obtained image 66b. At block 120, processor 29 identifies pattern discontinuities that occur at 55 and 57 as illustrated. At block 122, processor 29 identifies the distances between the sensor 25 and the portions of the surface 52 reflecting the light pattern 62b adjacent discontinuities 55 and 57.

Referring still to FIGS. 1-3, 4 and 5, at block 124, processor 29 uses the discontinuities and the sensor to surface distances to calculate the next instance W2 of the object dimension. At block 126, where the next instance of object dimension is not within a required tolerance value, control passes to block 132 where processor 29 selects a next light pattern as a function of the previous instances of object dimension. In at least some embodiments it is contemplated that the first time through block 126 it is presumed that the next instance of an objects dimension will not be within the required tolerance so that the first time through block 126, control always passes to block 132. The presumption that the tolerance requirement has not been met is because two lines will not provide sufficient information for determining if a measured dimension is near the shortest distance between opposite edges of an object's surface 52. At best, two lines can be used to generate first and second instances of an object dimension where one instance is shorter than the other instance and can be used to select a next projected light pattern that is more likely to be optimal. The idea here is that when attempting to identify a dimension W0, the system attempts to identify a minimum width dimension. Once three line pattern lengths have been determined where a center line pattern is shorter than the other two line patterns, the system can hunt for a minimum length by generating a next line pattern positioned between the shortest two of the three line patterns until the tolerance requirement (i.e., a relatively minimal change in pattern length between two consecutive line patterns) has been met. Other hunting techniques for identifying the minimal width dimension are contemplated.

Figure 7:
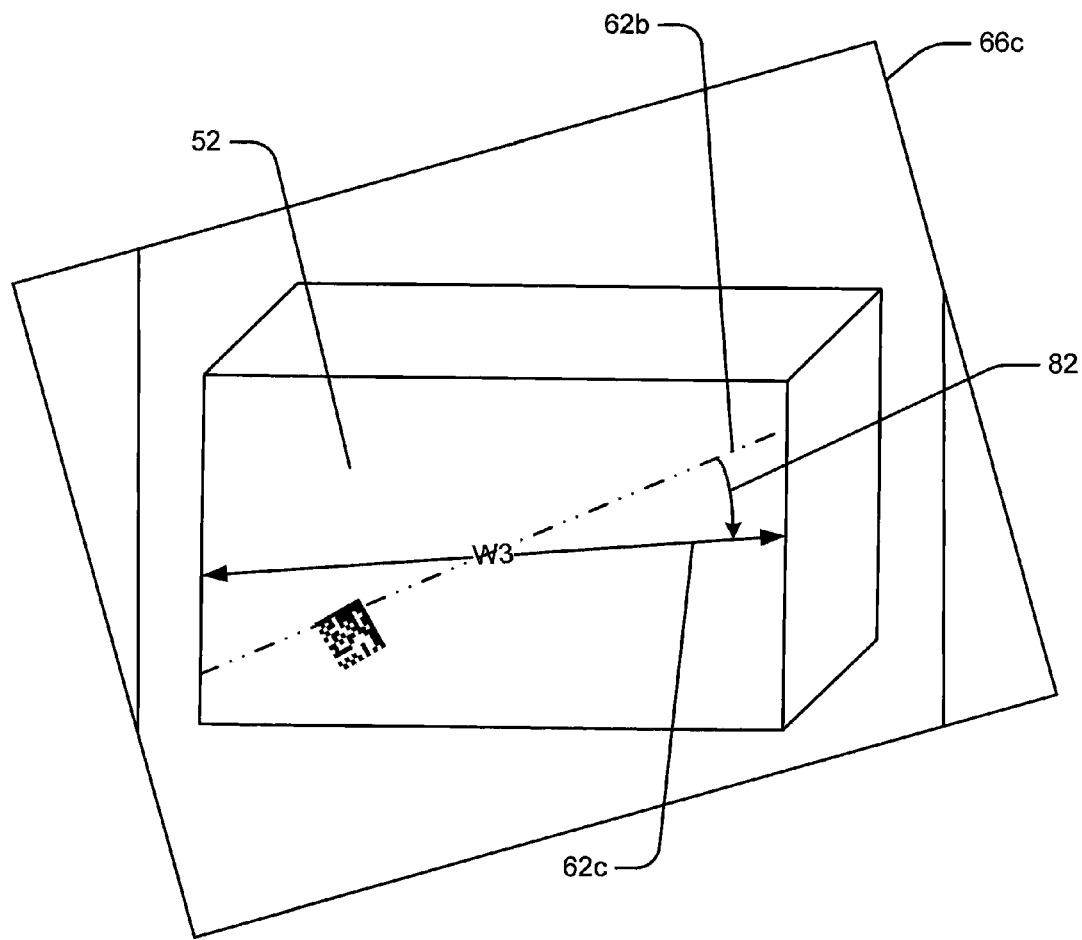
FIG. 7 is similar to FIG. 4, albeit showing a third light pattern on the cubic object within an image.

In the present example, referring to FIGS. 4 and 6, it should be appreciated that the next instance W2 of the object dimension is greater than the first instance W1 of the object dimension. As a general rule, with cubic objects like a box, an increase in a calculated width dimension when a next light pattern is used indicates a rotation of the pattern in the wrong direction. Thus, in the example shown in FIGS. 4 and 6, pattern 62*b* which was rotated in the counter-clockwise direction from pattern 62*a* was likely rotated in the wrong direction. For this reason in the illustrated example, at block 132, processor 29 identifies a third light pattern 62*c* shown in FIG. 7 as the next light pattern to be generated by light source 22 where third pattern 62*c* is rotated in a clockwise direction as indicated by arrow 82 from the second light pattern 62*b* (see phantom in FIG. 7). Here, pattern 62*c* is rotated in the clockwise direction past the angle of the first or original light pattern 62*a* shown in FIG. 4. Again, the degree of rotation 82 is a matter of designer choice. In the illustrated example rotation 82 is approximately 30 degrees. After block 132, control passes back up to block 114 where the process described above is repeated through block 126.

Referring again to FIG. 5, if the second instance W2 of object dimension were shorter than the first instance W1 instead of longer as illustrated in FIGS. 4 and 6, the relative lengths W1 and W2 would indicate that the initial rotation 80 may have been in the right direction. In this case, at block 132, processor 29 would select a next or third pattern rotated further in the counter-clockwise direction to hunt for the width dimension W0.

Referring still to FIGS. 1-3, 5 and 7, at block 126, processor 29 determines whether or not object dimension W3 calculated for pattern 62*c* is within the required tolerance value. Here, the determination at block 126 may include comparing dimension W3 to the prior dimensions W1 and W2 as shown in FIGS. 4 and 6 and recognizing that dimension W3 is less than both dimensions W1 and W2. The fact that dimension W3 is less than dimensions W1 and W2 means that pattern 62*c* is better aligned for identifying width dimension W0. However, because dimension W3 is less than dimension W1, it is possible that further clockwise rotation of the projected pattern will result in an even shorter width dimension measurement.

Figure 8:
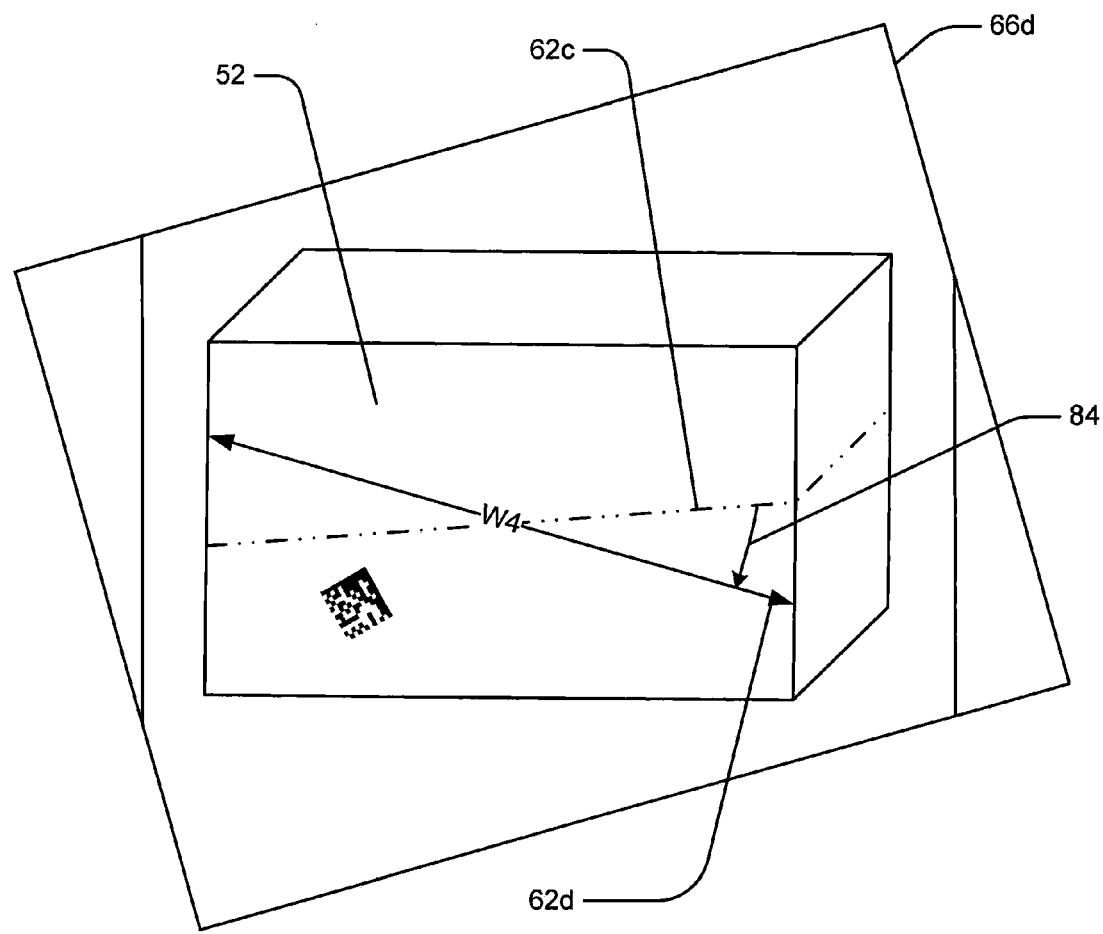
FIG. 8 is similar to FIG. 4, albeit showing a fourth light pattern on the cubic object within an image.

Because dimension W3 is smaller than the other dimensions W1 and W2, the process skips again from decision block 126 to block 132 where processor 29 selects a next light pattern as a function of previous dimension measurements W1 through W3. In the present example, fourth pattern 62*d* shown in FIG. 8 which is rotated further clockwise as indicated by arrow 84 from the third pattern 62*c* shown in phantom. Now, when the process cycles back through to block 126, processor 29 determines that dimension W4 is greater than dimension W3 and therefore that a pattern forming an angle between patterns 62*a* and 62*d* will result in a more accurate dimension calculation.

Figure 9:
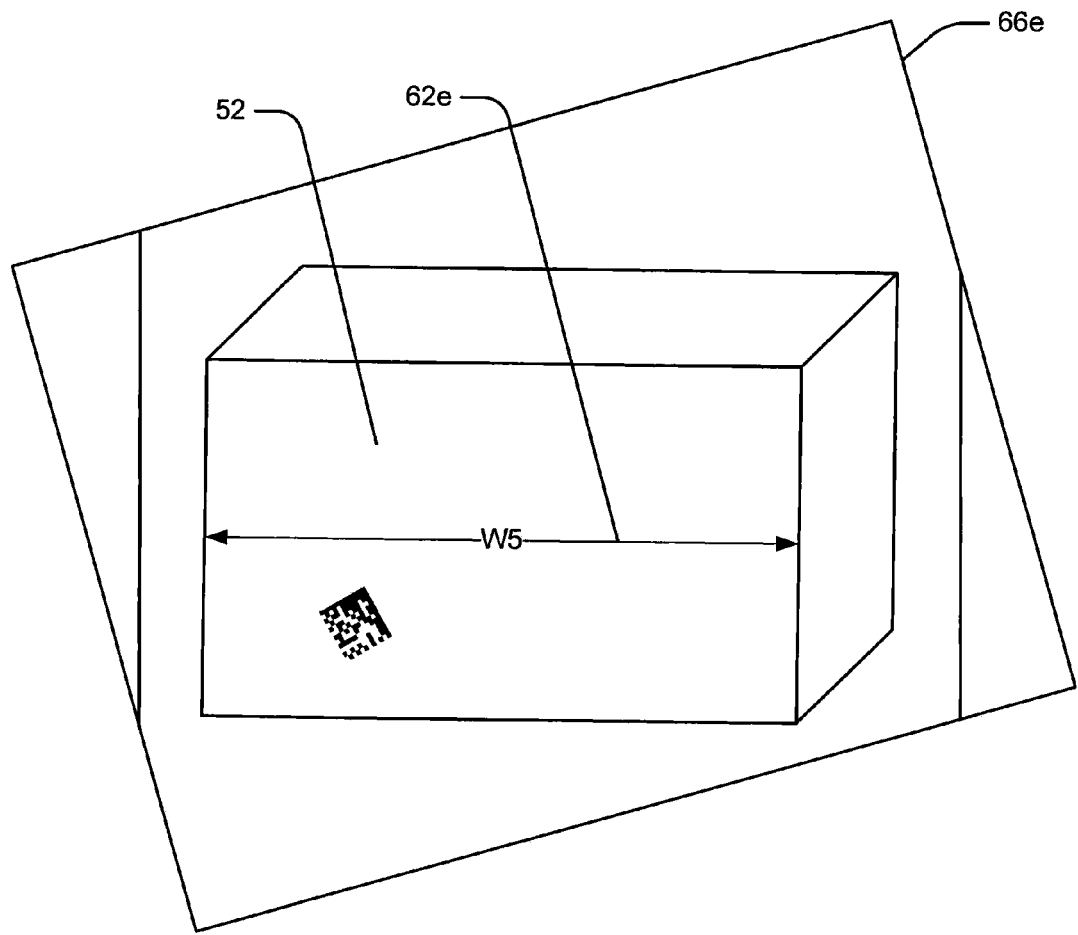
FIG. 9 is similar to FIG. 4, albeit showing a fifth light pattern on the cubic object within an image.

This process of cycling through blocks 114 to block 126 and then to block 132 in FIG. 5 continues with processor 29 selecting different light patterns until the condition at block 126 is met. For instance, once at least one calculated width dimension corresponding to a projected line pattern that is at an angle between two other line patterns is shorter than calculated width dimensions corresponding to the two other line patterns is identified and the change in calculated width dimensions between consecutive measurements is less than one centimeter, the tolerance requirement may be met. An exemplary relatively optimal light pattern 62*e* that may represent a last light pattern in the hunting sequence is shown in an image 66*e* in FIG. 9 where dimension W5 should be a relatively accurate representation of dimension W0 (see again FIG. 4) (e.g., within one centimeter in the present example). Once an instance of object dimension is within the required tolerance requirement, control passes from block 126 to block 128 where processor 29 transmits the object dimension via transceiver 26 to computer 32 for storage and perhaps reporting via display 11.

Referring again to FIG. 5, at block 129, processor 29 indicates that dimension W0 has been successfully measured via feedback assembly 28. For instance, processor 29 may light up one of the LEDs 28 or send a signal to computer 32 to indicate via display screen 11 that the dimension measurement has been successful. As another instance, processor 29 may cause light source 22 to project a double headed arrow on pattern 62*e* in FIG. 9 with the dimension value W5 spatially associated with the arrow. After block 129, control passes to block 130 where the process shown in FIG. 5 is repeated for a next dimension of the object. For example, the device user may next move device 12 to one of the side surfaces of object 42*b* and obtain a dimension measure therefore. In at least some cases, processor 29 or computer 32 may track measurements obtained and measurements still required and may provide guidance to the device user indicating a next measurement to obtain and eventually indicating that all required measurements have been obtained.

Figure 10:
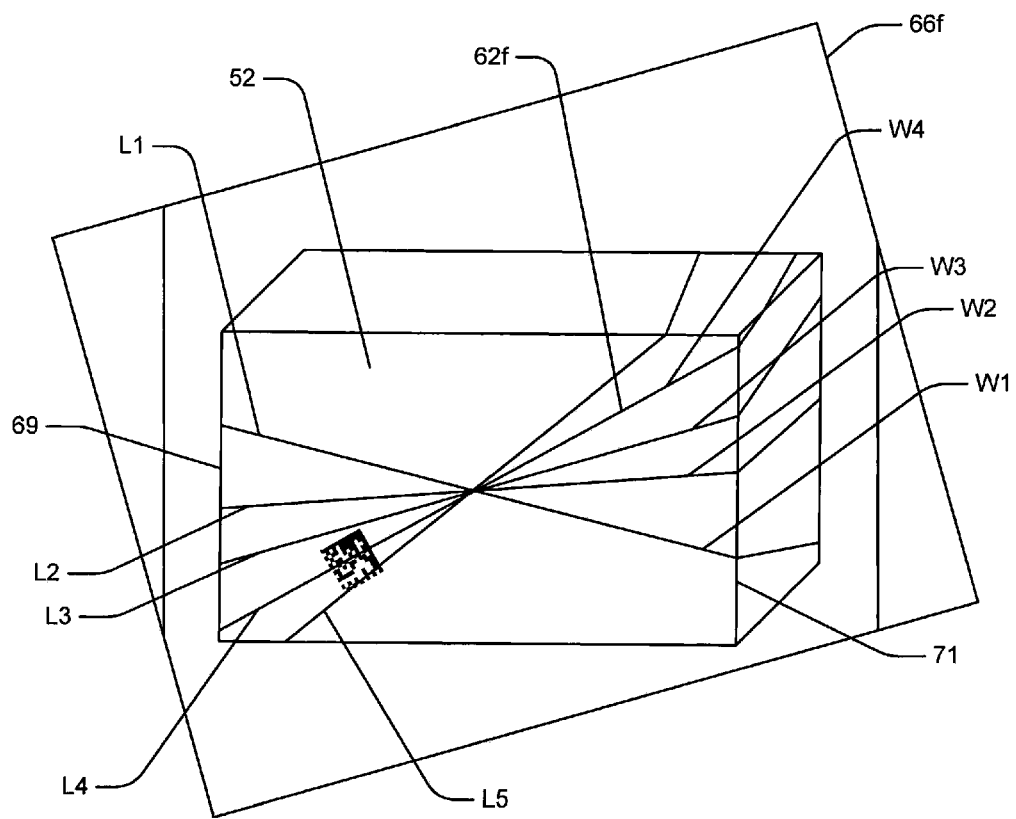
FIG. 10 is similar to FIG. 4, albeit showing a multi-line light pattern on the cubic object within an image.
Figure 11:
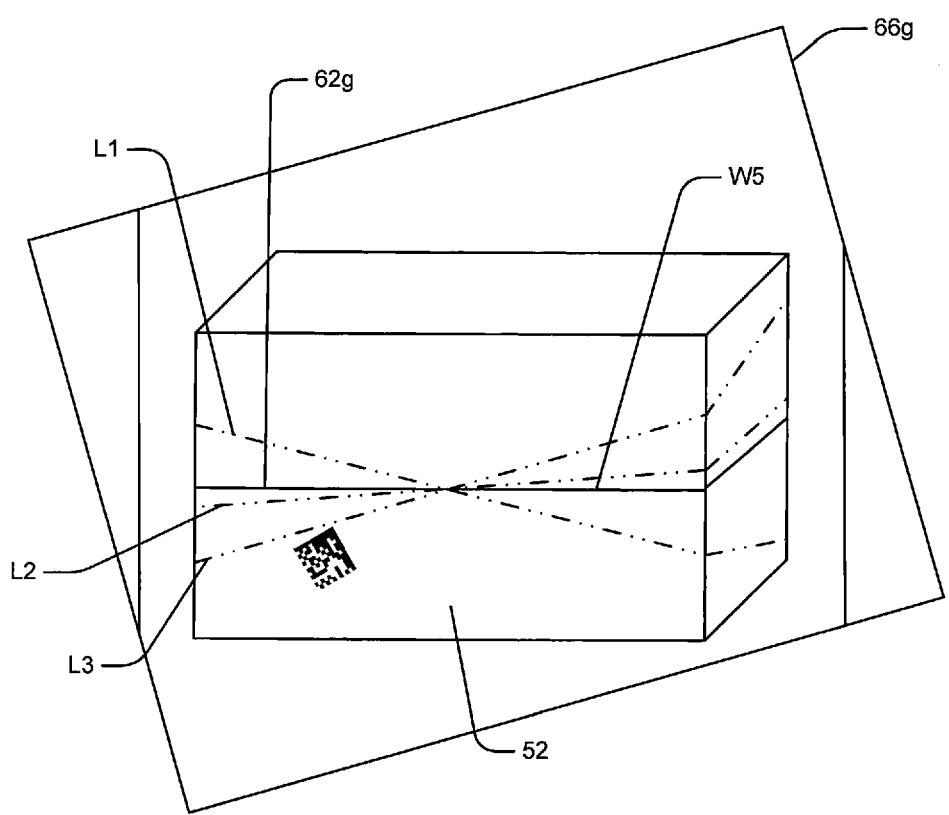
FIG. 11 is similar to FIG. 4, albeit showing one other light pattern in on the cubic object within an image.

While relatively simple line light patterns are described above, in other embodiments more complex light patterns are contemplated. For example, see image 66*f* shown in FIG. 10 that illustrates a relatively complex light pattern 62*f* that includes an array of five lines L1-L5 that have an intersecting central point and fan out there from in both directions at different angles. Here, when pattern 62*f* is employed, first processor 29 can be programmed to identify that only lines L1-L4 intersect the opposite edges of surface 52 that define the width dimension by identifying that the discontinuities at opposite ends of those lines together define straight edges of surface 52. Line L5 has discontinuities at edges of surface 52 that are not in line with the discontinuities of lines L1-L4 and therefore, line L5 can be discarded. Next processor 29 calculates dimensions W1 through W4 for each of the lines L1 through L4, respectively. Processor 29 compares dimensions W1 through W4 if the projected lines identifies the shortest of the four dimensions, and identifies the two projected lines corresponding to dimensions that frame the shortest dimension. In the illustrated example, the shortest dimension W2 corresponding to pattern line L2 which is framed by lines L1 and L3 that have longer dimensions. Processor 29 continues the process by projecting one or more lines with angles such that the lines occur between lines L1 and L3 until a threshold requirement is met (see pattern 62*g* in image 66*g* with width dimension W5 in FIG. 11).

Referring again to FIG. 10, in another exemplary system, processor 29 may be programmed to use a projected pattern to identify opposite edges 69 and 71 of surface 52 and to generate a subsequent projected pattern that is generally perpendicular to the identified edges 69 and 71 which is used for a final dimension calculation. For instance, edges 69 and 71 can be identified by the locations of discontinuities in projected lines L1-L4 and then a relatively optimal line pattern (see 62*g* in FIG. 11) that is generally perpendicular to the edges may be generated for a final dimension calculation.

Figure 12:
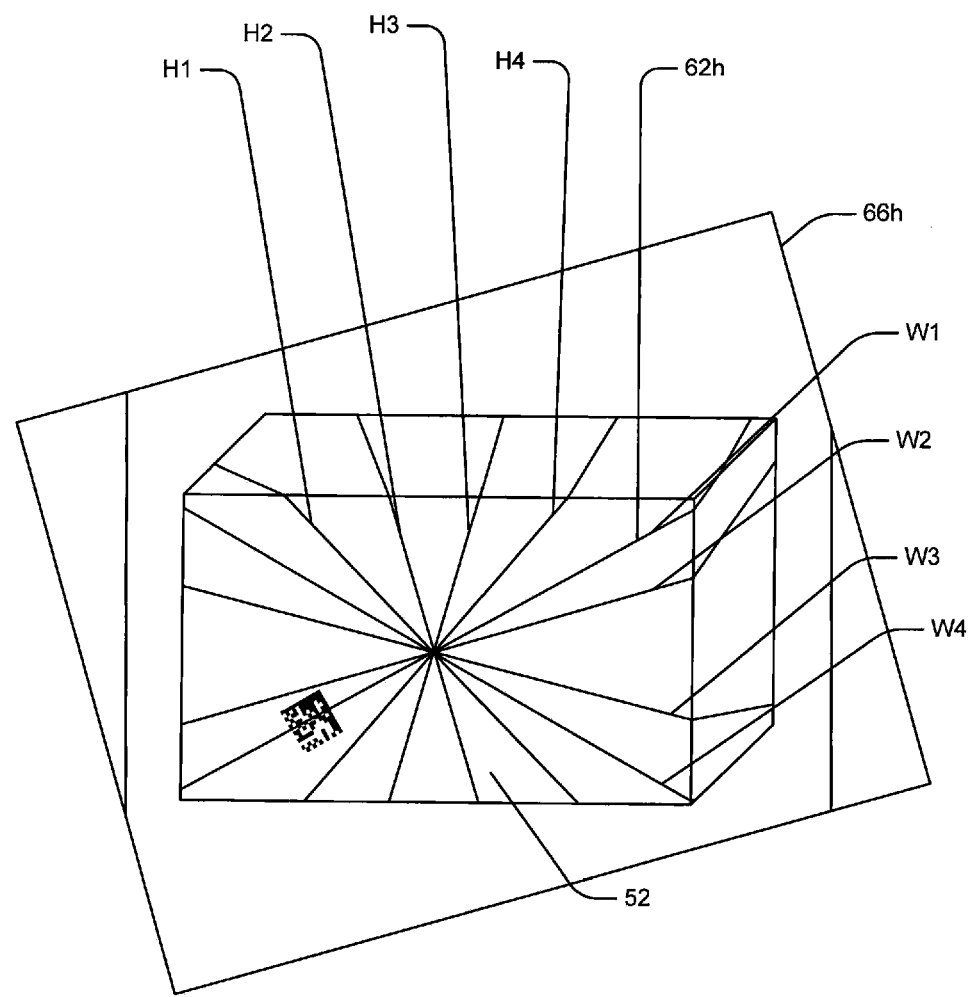
FIG. 12 is similar to FIG. 4, albeit showing another light pattern on the cubic object within an image.

While the examples described above are described in the context of a system that attempts to identify a single dimension of a cubic object at a time, it should be appreciated that in other more complex embodiments, processor 29 may be programmed to attempt to identify more than one object dimension at the same time using the same set of images. To this end, see FIG. 12 where another exemplary image 66$h$ is shown including a projected light pattern 62$h$ that includes eight separate lines that extend outwardly from a central point in both directions. Here, four of the lines can be used to calculate four separate width dimensions W1-W4 while the other four lines can be used to calculate separate height dimensions H1-H4. Once the initial height and width dimensions have been calculated, processor 29 can use those calculations to identify one or more additional light patterns that should generate height and width dimensions that are relatively more accurate than those possible using pattern 62$h$. Thereafter, processor 29 can cause light source 22 to generate the additional light patterns and hunt for dimensions until acceptably accurate dimensions have been identified (e.g., dimensions that meet the threshold requirements). Although not shown or described here in detail, it should be appreciated that in at least some embodiments even the third dimension shown in FIG. 12 may be calculated at the same time as the other two dimensions in a fashion similar to that described above.

Figure 13:
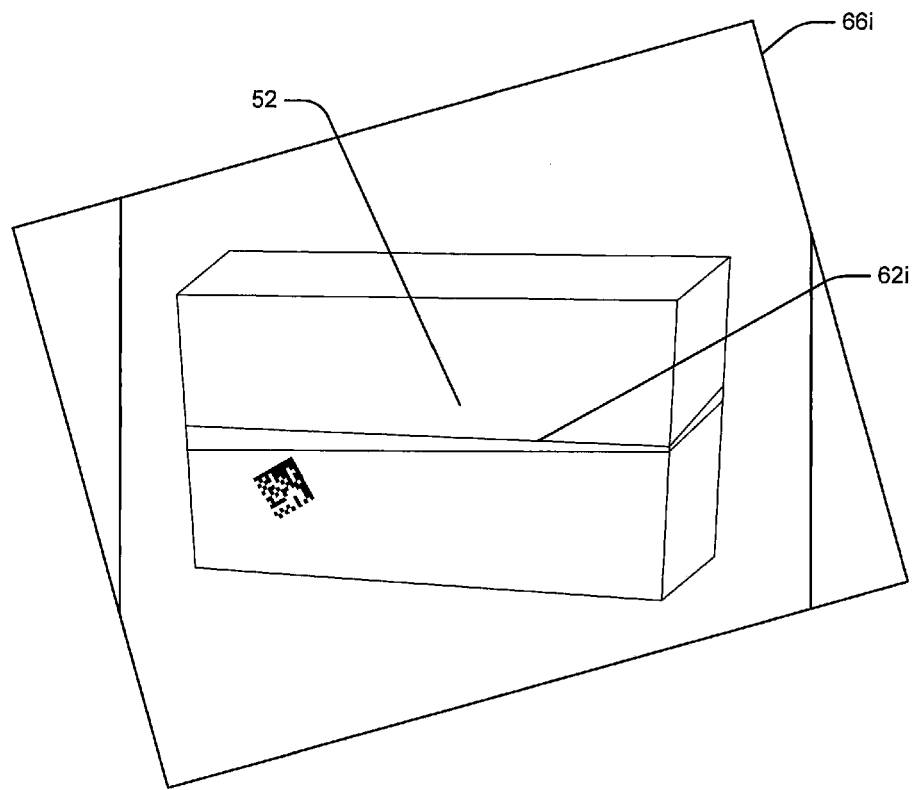
FIG. 13 is similar to FIG. 4, albeit showing a light pattern where the affects of the juxtaposition of a sensor with respect to objects surfaces in the image have been exaggerated in order to simplify this explanation.
Figure 14:
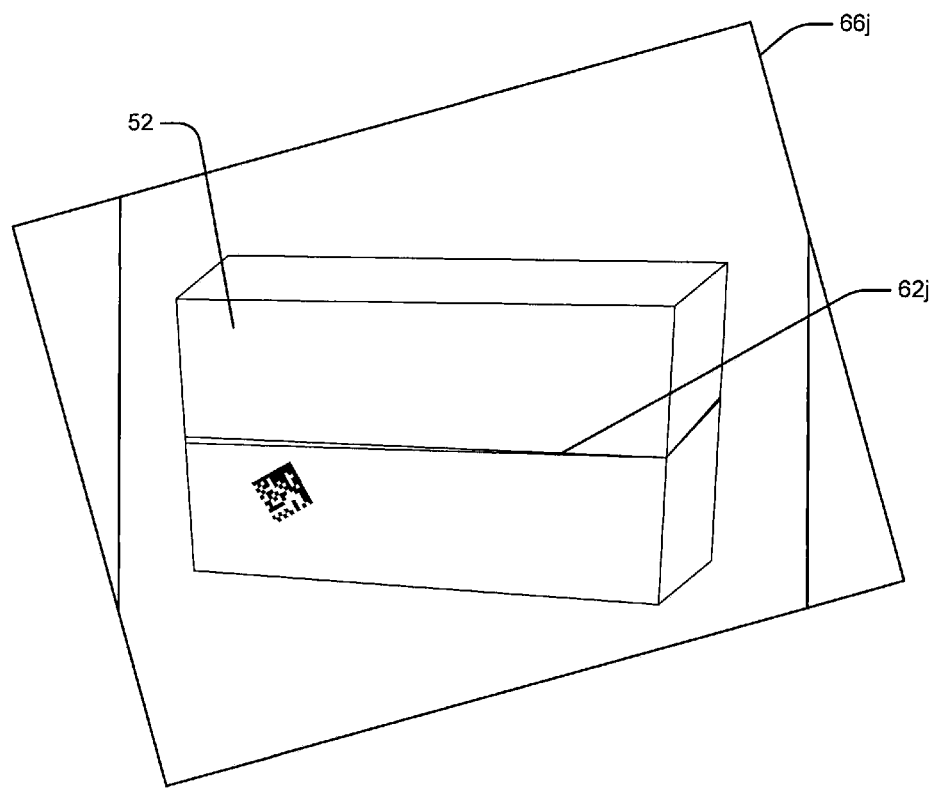
FIG. 14 is similar to FIG. 13, albeit showing exaggerated affects when a different light pattern is projected onto an object being imaged.

In addition to projecting light patterns that are selected as a function of the results associated with prior light patterns to obtain accurate dimension measurements, other processes that take advantage of intelligent iterative projection processes are contemplated. For instance, it may be that one projected light pattern results in greater relative sensor to surface distance distortion than other patterns that are better suited to identifying edge discontinuities. In this case, after edge discontinuities are identified using a first light pattern, a subsequent light pattern may be used to identify the sensor to surface distances adjacent the discontinuities. For instance, see FIG. 13 where a projected pattern 62$i$ appears in an image 66$i$ where the affects of sensor to surface distances have been exaggerated to clearly shown a wider pattern on the left portion of surface 52 than on the right portion (e.g., the sensor to surface distance to the left portion is greater than the distance to the right portion). While a relatively wide line as in FIG. 13 may be used to identify sensor to surface distances in a first subset of images during a dimensioning process, a thinner line pattern 62$j$ as in image 66$j$ of FIG. 14 may be used in a later subset of images resulting in greater accuracy.

In at least some embodiments device 12 may serve the additional function of operating as a bar, matrix or other type of code reader. To this end, referring again to FIGS. 1, 2 and 3, light source 22 may be controlled to light up all or a portion of sensor FOV 50 to illuminate a code candidate 44$b$ while sensor 25 obtains an image for decoding. Obtaining an image of a code and decoding may comprise a process to be performed separate and independent from the dimensioning process described above or may be sequential or simultaneous with the above process. When simultaneous, referring again to FIG. 4, while the FIG. 5 dimensioning process is being performed, processor 29 would search an obtained image 66$a$ for code candidates (e.g., image artifacts having characteristics that typically earmark a machine readable code). A search for candidates could include a series of images where source 22 is controlled to generate intense light in the areas of prior images including code candidates so that high quality candidate images result. Processor 29 is programmed in these embodiments to attempt to decode identified code candidates.

Figure 15:
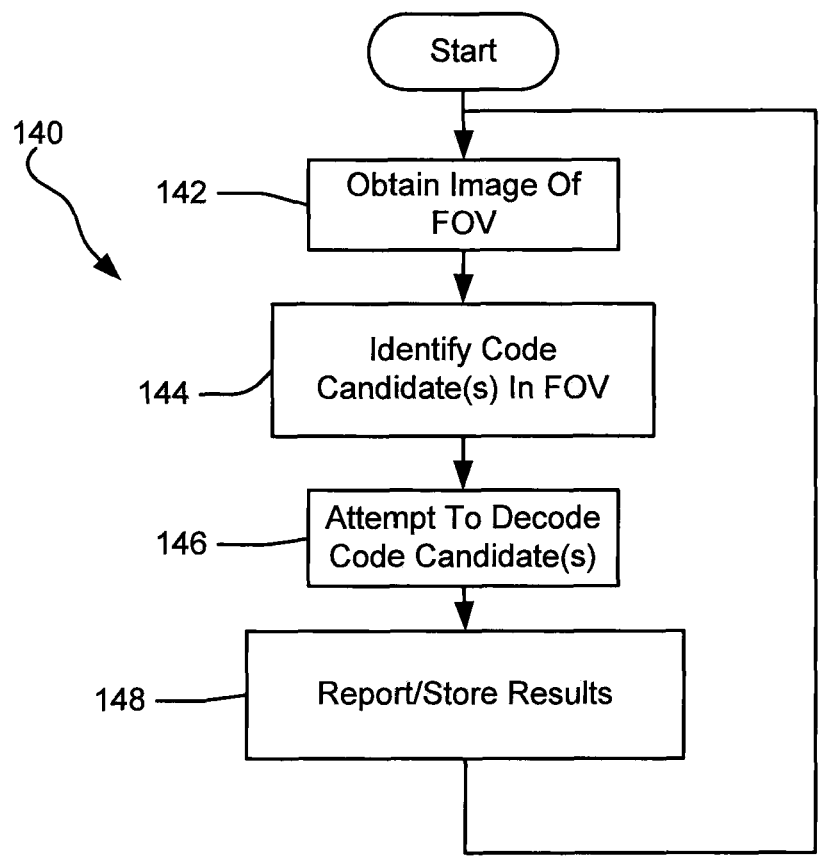
FIG. 15 is a flow chart illustrating a process that may be performed by the components of FIG. 3 to image and decode a machine readable code on an object for identifying and attempting to decode code candidates in an image that is consistent with at least some aspects of the present invention.

Referring to FIG. 15, an exemplary process 140 for identifying and attempting to decode candidates is illustrated. At block 142, with a device user aiming device 12 at the surface of an object that includes a code 44$b$, the device user presses button 18 (see FIGS. 1-3) causing device 12 to obtain an image of sensor FOV 50. At block 144, processor 29 identified code candidates in the obtained image. At block 146, processor 29 attempts to decode any code candidates and at block 148 results are stored (e.g., transmitted to computer 32 for storage) and/or reported. A status indication may also be provided via feedback devices 28) (see FIGS. 2 and 3). After block 148 control passes back up to block 142 where the process continues.

While the system and methods described above are described in the context of simple cubic objects with flat surfaces and simple geometric shapes, it should be appreciated that the inventive concepts and aspects may be employed to measure dimensions and other object characteristics of objects having other geometric shapes. For instance, cylinder dimensions or spherical dimensions may be measured accurately by providing a processor that iteratively changes projected patterns to hunt for an optimal pattern for measuring features or dimensions of those shapes.

In addition, it is contemplated that processor 29 may be capable of performing additional image analysis and selecting different projected patterns automatically as a function of results of the image analysis. For instance, processor 29 may be programmed to automatically recognize the shape of an object in an image and to employ different projected light patterns automatically as a function of which shape is identified to calculate dimensions.

For example, it may be that objects to be dimensioned using a specific system will have only one of two general shapes including cubic and cylindrical. A device 12 may be programmed to initially use one light pattern optimized for identifying the general shape of an imaged object as either cubic or cylindrical and thereafter to use different light pattern subsets for dimensioning where the subsets are specific to the identified general shape.

While the device and methods described above are described in the context of a system for measuring object dimensions, it should be appreciated that the device and similar methods could be used to quantify any of several different object features or characteristics. For instance, angles between object surfaces may be quantified, curvatures of surfaces may be quantified, general shapes may be quantified, etc., using iterative and intelligently selected sequential projected light patterns and image analysis.

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

To apprise the public of the scope of this invention, the following claims are made:

The invention claimed is:

1. A handheld device for determining at least one dimension of an object, the device comprising:
   a hand held device housing structure;
   a sensor mounted within the housing structure, the sensor receiving light from within a sensor field of view (FOV) to generate a plurality of consecutive images of the sensor FOV;
   a structured light source that is controllable to generate a plurality of light patterns, the structured light source mounted to the housing for movement along with the sensor and arranged to project at least one of the plurality of light patterns into the sensor FOV where at least a portion of a projected light pattern reflects from an object located within the sensor FOV and is captured by the sensor; and
   a processor linked to the sensor to receive images of the sensor FOV generated by the sensor, the processor programmed to control the structured light source to project a light pattern into the sensor FOV, locate the projected light pattern in at least one of the generated images, locate discontinuities in the projected light pattern and use the discontinuities to measure the at least one dimension of the object in the sensor FOV,
   wherein the processor is programmed to analyze the projected light pattern in at least one of the generated images and generate through computational means a subsequent projected light pattern as a function of the analysis wherein the subsequent projected light pattern is not physically pre-determined using mechanical means or pre-stored in memory.

2. The handheld device of claim 1 wherein the processor is programmed to identify different projected light patterns in at least a first and a second of the consecutive images and identifies discontinuities in each of the first and second images.

3. The handheld device of claim 2 wherein the processor is programmed to identify the at least one dimension of the object using the discontinuities in each of the first and second light patterns and to select one of the identified dimensions as the at least one dimension.

4. The handheld device of claim 1 wherein the processor is programmed to select the subsequent projected light pattern as a function of the identified at least one dimension associated with at least a subset of the prior image.

5. The handheld device of claim 1 wherein the processor is programmed to identify a first projected light pattern in a first of the consecutive images, identify discontinuities in the first identified light pattern and use the discontinuities in the first light pattern to identify a first instance of the at least one dimension of the object, identify a second projected light pattern in a second of the consecutive images, identify discontinuities in the second identified light pattern and use the discontinuities in the second light pattern to identify a second instance of the at least one dimension of the object, compare the first and second instances of the at least one dimension of the object and select a third light pattern to project into the FOV when the sensor obtains light to generate a third image by comparing the first and second instances of the at least one dimension.

6. The handheld device of claim 5 wherein the processor is further programmed to identify the third projected light pattern in the third image, identify discontinuities in the third identified light pattern and use the discontinuities in the third light pattern to identify a third instance of the at least one dimension of the object, and select a fourth light pattern to project into the FOV when the sensor obtains light to generate a fourth image by comparing the third instance of the at least one dimension to at least one of the first and second instances of the at least one dimension.

7. The handheld device of claim 1 wherein the processor is further programmed to identify projected light patterns in at least a subset of the plurality of generated images, identify discontinuities in each of the identified projected light patterns and use the discontinuities to identify a separate instance of the at least one dimension of the object for each of the subset of the plurality of generated images.

8. The handheld device of claim 7 wherein the processor selects the shortest of the separate instances of the at least one dimension as the at least one dimension.

9. The handheld device of claim 1 wherein the processor is programmed to continually obtain consecutive images using different light patterns until the processor identifies the at least one dimension of the object.

10. The handheld device of claim 1 wherein the processor is further programmed to compare the light patterns projected to the light patterns in the obtained images to identify a distance between the sensor and the surface of the object form which the light reflects and to us the identified distance as part of a calculation to identify the at least one dimension.

11. The handheld device of claim 1 wherein at least one of the projected light patterns is selected to generate a rough estimate of the distance between the sensor and the surface of the object from which light reflects and a subsequent one of the projected light patterns is selected to generate a more precise measurement of the distance between the sensor and the surface of the object from which the light reflects.

12. The handheld device of claim 1 wherein the processor is further programmed to identify machine readable code candidates in the obtained image and to attempt to decode identified code candidates.

13. The handheld device of claim 1 further including a user selectable activator linked to the processor for triggering the light source, sensor and processor to project light patterns, obtain images of the FOV and process the obtained images.

14. The handheld device of claim 1 wherein the structured light source includes a digital light processing (DLP) projector.

15. The handheld device of claim 14 wherein the processor uses a DLP metrology process to identify the at least one dimensional feature.

16. The handheld device of claim 14 wherein the processor is further programmed to identify machine readable code candidates in the obtained image and attempt to decode the code candidates and wherein the structured light source includes a digital light processing (DLP) projector, the DLP projector controlled by the processor to generate the light patterns in the images and to also generate light to illuminate code candidates within the FOV.

17. The handheld device of claim 1 wherein the processor uses an iterative projection process to generate the subsequent projected light pattern.

18. The handheld device of claim 1 wherein the processor uses a hunting technique to generate the subsequent projected light pattern.

19. A handheld device for determining at least one dimension of an object, the device comprising:
   a hand held device housing structure;
   a sensor mounted within the housing structure, the sensor receiving light to within a sensor field of view (FOV) to generate images of the sensor FOV;
   an illuminator mounted to the housing for movement along with the sensor and arranged to project a plurality of different light patterns into the sensor FOV where at least a portion of the projected light pattern reflects from an object located within the sensor FOV and is captured by the sensor; and a processor linked to the sensor to receive images of the sensor FOV and linked to the illuminator for controlling selection of a first projected light pattern, the processor programmed to locate the first projected light pattern in a first obtained image, examine the first projected light pattern to generate through computational means a second light pattern that may be better suited to locate discontinuities useful in identifying the at least one dimension of the object in the sensor FOV wherein the second light pattern is not physically pre-determined using mechanical means or pre-stored in memory, control the illuminator to project the second light pattern into the sensor FOV while a second image is obtained, locate the second pattern in the second image, locate discontinuities in the second pattern and use the discontinuities in the second light pattern to measure the at least one dimension of the object in the sensor FOV.

20. The handheld device of claim 19 wherein the illuminator is a digital light processing (DLP) projector.

21. The handheld device of claim 19 wherein the projector projects patterns into the FOV and the processor identifies discontinuities by comparing the projected patterns to the patterns identified in the obtained images.

22. A method for use with a handheld device for determining at least one dimension of an object, the handheld device including an image sensor having a field of view (FOV) and an illuminator mounted to a handheld housing so that the sensor and illuminator are manipulated as a single unit, the method comprising the steps of:

using a processor in the handheld device to perform the steps of:

projecting a first light pattern into the sensor FOV while an object is located within the sensor FOV;

obtaining an image of the sensor FOV;

locating the first projected light pattern in a first obtained image;

examining the first projected light pattern to generate through computational means a second light pattern that may be better suited to locate discontinuities useful in identifying the at least one dimension of the object in the sensor FOV wherein the second light pattern is not physically pre-determined using mechanical means or pre-stored in memory;

controlling the illuminator to project the second light pattern into the sensor FOV while a second image is obtained;

locating the second light pattern in the second image;

locating discontinuities in the identified second light pattern; and using the discontinuities in the identified second light pattern to measure the at least one dimension of the object in the sensor FOV.

* * * * *